United States Patent
Prophete et al.

(10) Patent No.: US 10,162,872 B2
(45) Date of Patent: *Dec. 25, 2018

(54) SYSTEM, METHOD AND COMPUTER PROGRAM PRODUCT FOR PERFORMING A SYNCHRONIZATION OF DATA

(71) Applicant: salesforce.com, inc., San Francisco, CA (US)

(72) Inventors: Didier Prophete, San Francisco, CA (US); Ronald F. Fischer, San Francisco, CA (US); Sönke Rohde, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,590

(22) Filed: Apr. 28, 2017

(65) Prior Publication Data

US 2017/0235807 A1 Aug. 17, 2017

Related U.S. Application Data

(63) Continuation of application No. 14/788,538, filed on Jun. 30, 2015, now Pat. No. 9,646,068, which is a continuation of application No. 14/059,376, filed on Oct. 21, 2013, now Pat. No. 9,100,240, which is a continuation of application No. 13/117,034, filed on May 26, 2011, now Pat. No. 8,595,382.

(60) Provisional application No. 61/352,312, filed on Jun. 7, 2010.

(51) Int. Cl.
*H04L 29/06* (2006.01)
*G06F 17/30* (2006.01)
*H04L 29/08* (2006.01)
*G06F 15/16* (2006.01)

(52) U.S. Cl.
CPC .. *G06F 17/30575* (2013.01); *H04L 29/06047* (2013.01); *H04L 67/1095* (2013.01); *H04L 67/02* (2013.01); *H04L 67/1017* (2013.01)

(58) Field of Classification Search
CPC .......... G06F 17/30575; H04L 67/1017; H04L 67/1095; H04L 67/02; H04L 29/06047
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Alina A Boutah
(74) *Attorney, Agent, or Firm* — Meyertons, Hood, Kivlin, Kowert & Goetzel, P.C.

(57) ABSTRACT

In accordance with embodiments, there are provided mechanisms and methods for performing a synchronization of data. These mechanisms and methods for performing a synchronization of data can enable a more efficient synchronization, time and resource savings, an enhanced user experience, etc.

20 Claims, 6 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,363,388 B2 | 4/2008 | Huang et al. |
| 7,401,094 B1 | 7/2008 | Kesler |
| 7,412,455 B2 | 8/2008 | Dillon |
| 7,508,789 B2 | 3/2009 | Chan |
| 7,574,444 B2 | 8/2009 | Welingkar et al. |
| 7,620,655 B2 | 11/2009 | Larsson et al. |
| 7,650,432 B2 * | 1/2010 | Bosworth ......... G06F 17/30575 709/201 |
| 7,698,160 B2 | 4/2010 | Beaven et al. |
| 7,730,478 B2 | 6/2010 | Weissman |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,458,127 B1 | 6/2013 | Lorch, III et al. |
| 8,484,111 B2 | 7/2013 | Frankland et al. |
| 8,489,974 B2 | 7/2013 | Movida et al. |
| 8,595,382 B2 * | 11/2013 | Prophete ............ H04L 67/1095 707/610 |
| 9,100,240 B2 * | 8/2015 | Prophete ............ H04L 67/1095 |
| 9,646,068 B2 * | 5/2017 | Prophete ............ H04L 67/1095 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 * | 8/2003 | Huang ............ G06F 17/30578 717/171 |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0208559 A1 * | 11/2003 | Velline .................. H04W 4/18 709/218 |
| 2003/0220968 A1 * | 11/2003 | Hickson ................ H04L 29/06 709/203 |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0224674 A1 * | 11/2004 | O'Farrell et al. ......... G06F 17/30575 455/418 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0021784 A1 * | 1/2005 | Prehofer ................ H04L 29/06 709/229 |
| 2005/0044165 A1 * | 2/2005 | O'Farrell et al. ...... G06Q 10/10 709/213 |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0097225 A1 * | 5/2005 | Glatt ................ H04L 67/1095 709/248 |
| 2005/0223022 A1 | 10/2005 | Weissman et al. |
| 2005/0278458 A1 * | 12/2005 | Berger ............ G06F 17/30575 709/248 |
| 2005/0283478 A1 | 12/2005 | Choi et al. |
| 2006/0021019 A1 | 1/2006 | Hinton et al. |

(56) References Cited

U.S. PATENT DOCUMENTS

| | | | | |
|---|---|---|---|---|
| 2006/0206834 | A1 | 9/2006 | Fisher et al. | |
| 2006/0229097 | A1* | 10/2006 | Flynt | H04M 1/2745 455/551 |
| 2006/0248232 | A1 | 11/2006 | Chasman et al. | |
| 2007/0016695 | A1 | 1/2007 | Rabbers et al. | |
| 2007/0150444 | A1* | 6/2007 | Chesnais | H04W 4/02 |
| 2007/0198743 | A1* | 8/2007 | Huang | G06F 17/30575 709/248 |
| 2007/0198746 | A1 | 8/2007 | Myllyla et al. | |
| 2007/0283011 | A1* | 12/2007 | Rakowski | H04L 41/0803 709/225 |
| 2007/0283049 | A1 | 12/2007 | Rakowski et al. | |
| 2008/0034421 | A1* | 2/2008 | Ahn | G06F 21/10 726/17 |
| 2008/0040743 | A1* | 2/2008 | Dharmaji | G06F 15/02 725/35 |
| 2008/0249972 | A1 | 10/2008 | Dillon | |
| 2009/0063415 | A1 | 3/2009 | Chatfield et al. | |
| 2009/0063660 | A1* | 3/2009 | Fleischman | G11B 27/10 709/219 |
| 2009/0077262 | A1* | 3/2009 | Roberts | G06F 11/1662 709/248 |
| 2009/0083441 | A1* | 3/2009 | Clark | H04L 67/1095 709/248 |
| 2009/0100342 | A1 | 4/2009 | Jakobson | |
| 2009/0144451 | A1* | 6/2009 | Cabezas | G06F 17/30884 709/248 |
| 2009/0177744 | A1 | 7/2009 | Marlow et al. | |
| 2009/0210631 | A1* | 8/2009 | Bosworth | G06F 12/0875 711/141 |
| 2009/0282125 | A1* | 11/2009 | Jeide | H04L 67/1095 709/217 |
| 2009/0291668 | A1* | 11/2009 | Huang | G06K 7/0008 455/410 |
| 2010/0088297 | A1* | 4/2010 | Kiilerich | H04L 67/06 707/705 |
| 2010/0100463 | A1* | 4/2010 | Molotsi | G06Q 10/04 705/32 |
| 2010/0190474 | A1 | 7/2010 | Rajguru | |
| 2010/0234051 | A1* | 9/2010 | Holden | H04B 1/3805 455/466 |
| 2011/0016465 | A1* | 1/2011 | Siegel | H04L 67/1095 717/178 |
| 2011/0161290 | A1* | 6/2011 | Waterman | G06F 17/30575 707/621 |
| 2011/0173294 | A1* | 7/2011 | Jackson | G06F 17/30575 709/217 |
| 2011/0218958 | A1 | 9/2011 | Warshavsky et al. | |
| 2011/0247051 | A1 | 10/2011 | Bulumulla et al. | |
| 2011/0251992 | A1* | 10/2011 | Bethlehem | H04L 12/2863 707/610 |
| 2011/0302479 | A1 | 12/2011 | Movida et al. | |
| 2011/0313972 | A1 | 12/2011 | Albouze | |
| 2012/0042218 | A1 | 2/2012 | Cinarkaya et al. | |
| 2013/0218948 | A1 | 8/2013 | Jakobson | |
| 2013/0218949 | A1 | 8/2013 | Jakobson | |
| 2013/0218966 | A1 | 8/2013 | Jakobson | |
| 2013/0247216 | A1 | 9/2013 | Cinarkaya et al. | |
| 2014/0359537 | A1 | 12/2014 | Jackobson et al. | |
| 2015/0006289 | A1 | 1/2015 | Jackobson et al. | |
| 2015/0007050 | A1 | 1/2015 | Jackobson et al. | |
| 2015/0095162 | A1 | 4/2015 | Jackobson et al. | |
| 2015/0142596 | A1 | 5/2015 | Jackobson et al. | |
| 2015/0172563 | A1 | 6/2015 | Jackobson et al. | |
| 2018/0039685 | A1* | 2/2018 | Prophete | G06F 17/30575 |

\* cited by examiner

SYSTEM, METHOD AND COMPUTER PROGRAM PRODUCT FOR PERFORMING A SYNCHRONIZATION OF DATA

CLAIM OF PRIORITY

The present application is a continuation of U.S. application Ser. No. 14/788,538, filed Jun. 30, 2015 (now U.S. Pat. No. 9,646,068), which is a continuation of U.S. application Ser. No. 14/059,376, filed Oct. 21, 2013 (now U.S. Pat. No. 9,100,240), which is a continuation of U.S. application Ser. No. 13/117,034, filed May 26, 2011 (now U.S. Pat. No. 8,595,382), which claims priority to U.S. Provisional Appl. No. 61/352,312, filed Jun. 7, 2010; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data storage, and more particularly to maintaining data consistency between entities.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire to store one or more copies of data in a plurality of locations. For example, identical data records may be stored both at a client of a system as well as a server of the system, and may be periodically synchronized (e.g., for purposes of maintaining updated data, etc.). Unfortunately, traditional data synchronization techniques have been associated with various limitations.

Just by way of example, systems may perform general data synchronizations that may fail to account for one or more specific circumstances associated with the client and/or server. Additionally, the general data synchronizations may perform unnecessary transfers of data, may transfer data at inconvenient times, etc. Accordingly, it is desirable to synchronize data between a client and a server in an optimized fashion.

BRIEF SUMMARY

In accordance with embodiments, there are provided mechanisms and methods for performing a synchronization of data. These mechanisms and methods for performing a synchronization of data can enable a more efficient synchronization, time and resource savings, an enhanced user experience, etc.

In an embodiment and by way of example, a method for performing a synchronization of data is provided. In one embodiment, a client and a server of a system are identified. Additionally, it is determined that a user has successfully logged into an application of the client. Further, a synchronization of data associated with the application is performed between the client and the server.

While one or more implementations and techniques are described with reference to an embodiment in which performing a synchronization of data is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for performing a synchronization of data.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for performing a synchronization of data will be described with reference to example embodiments.

Figure 1:
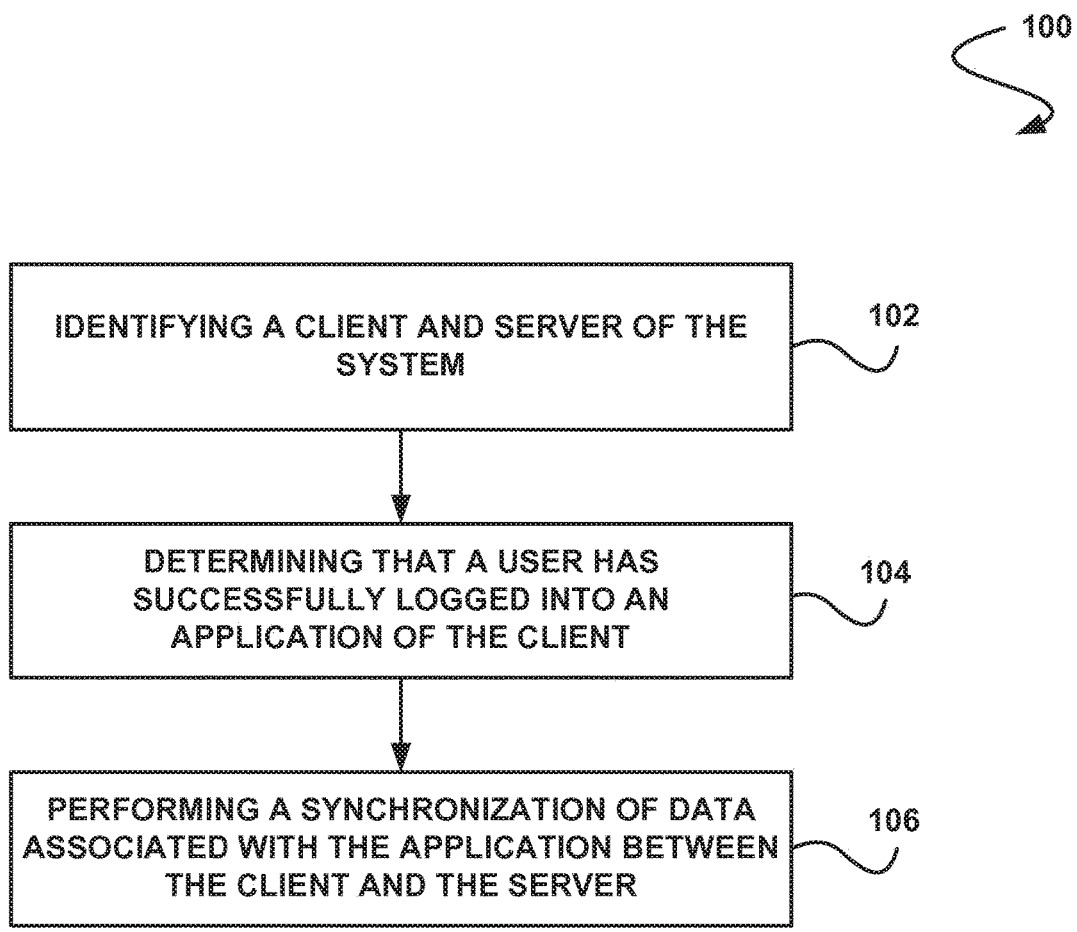
FIG. 1 illustrates a method for performing a synchronization of data, in accordance with one embodiment.

FIG. 1 illustrates a method 100 for performing a synchronization of data, in accordance with one embodiment. As shown in operation 102, a client and a server of a system are identified. In one embodiment, the client of the system may include a desktop computer, a laptop computer, a handheld device (e.g., a cell phone, personal digital assistant (PDA), etc.), or any other device capable of performing computation. In another embodiment, the server of the system may include a server computer, a cloud computing environment, a multi-tenant on-demand database system, etc.

Additionally, in one embodiment, the client may be one of a plurality of clients of the system. In another embodiment, the server may be one of a plurality of servers of the system. In yet another embodiment, the client and the server of the system may communicate utilizing a network. In still another embodiment, both the client and the server may store copies of the same data. For example, a copy of data stored in the server may also be stored in the client. In another example, a copy of data stored in the client may also be stored in the server. In another embodiment, the data may be associated with an application of the client.

Further, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, it is determined that a user has successfully logged into an application of the client. In one embodiment, the application of the client may include an application that is installed within the client. For example, the application may include a messaging application, a personal information manager, etc. In another embodiment, the application may include data that is shared with the server of the system. For example, the application may be associated with a local copy of data stored within the server of the system.

In addition, in one embodiment, the user may log into the client utilizing a graphical user interface (GUI). For example, the user may input login information (e.g., a user name, password, etc.) into the GUI using an input device (e.g., a keyboard, mouse, etc.) and select an icon to confirm that such input information is correct. In another embodiment, it may be determined that the user has successfully logged into the application by comparing the input login with login information stored at the client, at the server, etc. Further, in one embodiment, the user may include a customer of a service that is provided by the system. For example, the user may subscribe to one or more services provided by the server of the system.

Further still, as shown in operation 106, a synchronization of data associated with the application is performed between the client and the server. In one embodiment, the data may include data stored at the client and/or server that is used by the application. For example, the data may include object data, detail data, metadata, etc. In another embodiment, the synchronization may be performed in response to the determination that the user has successfully logged into the application of the client. For example, the synchronization may be performed immediately after the user successfully logs into the application.

In yet another embodiment, performing the synchronization may include determining whether the user has logged into the application for the first time. For example, if it is determined that the user has logged into the application for the first time, then one or more elements of metadata may be retrieved from the server and stored at a local cache of the client. In another example, a local database may be initialized within the client once the elements of metadata are fetched and cached at the client. In yet another example, a full synchronization may occur between the client and the server once the database is initialized.

Also, in one embodiment, performing the synchronization may include determining whether the user has previously logged in to the application of the client. For example, if it is determined that the user has previously logged into the application, all uncommitted modifications of the data on the client may be sent to the server. Additionally, in another embodiment, performing the synchronization may include retrieving metadata from the server to the client and comparing the metadata to metadata retrieved during an earlier login (e.g., metadata retrieved in response to the first user login, metadata retrieved in response to a login before the current login, etc.).

Further, another embodiment, performing the synchronization may include conditionally clearing a local database of the client in response to the determination that differences exist between the retrieved metadata and the metadata retrieved during an earlier login. For example, in response to the determination that differences exist, the user may be asked whether to clear the local client database and perform a full synchronization between the client and server or to maintain the local client database and perform an incremental synchronization between the client and the server.

Further still, in one embodiment, performing the synchronization may include determining whether any dataset changes have occurred with respect to a user of the system. In another embodiment, performing the synchronization may include performing an incremental synchronization between the client and the server if it is determined that no dataset changes have occurred with respect to the user. In yet another embodiment, performing the synchronization may include performing a full incremental synchronization between the client and the server if it is determined that dataset changes have occurred with respect to the user.

Also, in one embodiment, a runtime synchronization may be performed while the application is running on the client. In another embodiment, the runtime synchronization may be performed at a predetermined interval. In yet another embodiment, the runtime synchronization may be performed after the initial synchronization of data is performed responsive to the user logging onto the application. In still another embodiment, the runtime synchronization may include determining whether any dataset changes have occurred with respect to the user since the last synchronization.

Additionally, in one embodiment, performing the runtime synchronization may include retrieving metadata from the server to the client and comparing the metadata to metadata retrieved during an earlier login if dataset changes have occurred with respect to the user since the last synchronization. In another embodiment, performing the runtime synchronization may include alerting the user in response to a determination that differences exist between the retrieved metadata and the metadata retrieved during the earlier login.

In this way, the synchronization of the client and server may be integrated into a login process of the user to ensure consistency between the client and server. Additionally, the system synchronization may be dynamically adjusted based on the type of login that is being performed (e.g., an initial login, a subsequent login, etc.). Further, the client and server may be additionally synchronized while the application is running in order to ensure that data stored at both the client and server is current for a predetermined time period. Further still, the system may examine and/or determine a magnitude of the differences between data at the client and server in order to determine various consistency solutions.

Figure 2:
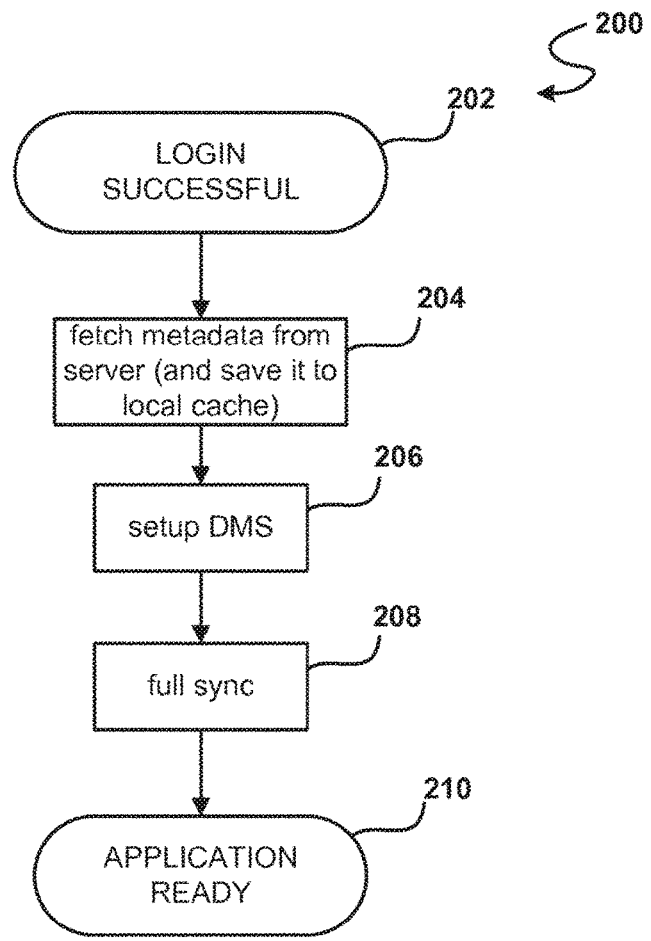
FIG. 2 illustrates a method for performing system synchronization during an initial login, in accordance with another embodiment.

FIG. 2 illustrates a method 200 for performing system synchronization during an initial login, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, it is determined that an initial login is successful. In one embodiment, the successful login may be performed by a user logging in to an application installed at a client of a system. For example, the user may enter a user name and password into the application, which are subsequently verified by the application.

Additionally, as shown in operation 204, metadata is fetched from a server of the system and saved in a local cache of the client. In one embodiment, the metadata may describe one or more types of data stored at the server. For example, the metadata may describe one or more objects stored within the system (e.g., an account object, an opportunity object, a lead object, etc.), one or more fields for an object (e.g., a name field, an address field, a phone number field, etc.) In another embodiment, the metadata may describe one or more types of data associated with the application of the client. For example, the metadata may describe one or more objects that are used by an account of the user within the application.

Further, as shown in operation 206, a data management service (DMS) is set up at the client. In one embodiment, setting up the DMS at the client may include creating a local database at the client. For example, a local database may be created at the client that includes tables for each object on the server described by the metadata. Further still, as shown in operation 208, a full synchronization is performed between the client and server of the system. For example, all user data on the server that is associated with the application of the client may be copied and sent to the client, where it may be stored in the local database of the client. In one embodiment, the data sent during the synchronization may include data of object types described by the fetched metadata.

Also, as shown in operation 210, it is determined that the application on the client is ready for use. In one embodiment, it may be determined that the application on the client is ready once it is confirmed that the full synchronization has been successfully performed. In this way, the application on the client of the system may initialize and populate a local database of application data associated with the user from data stored on the server.

Figure 3:
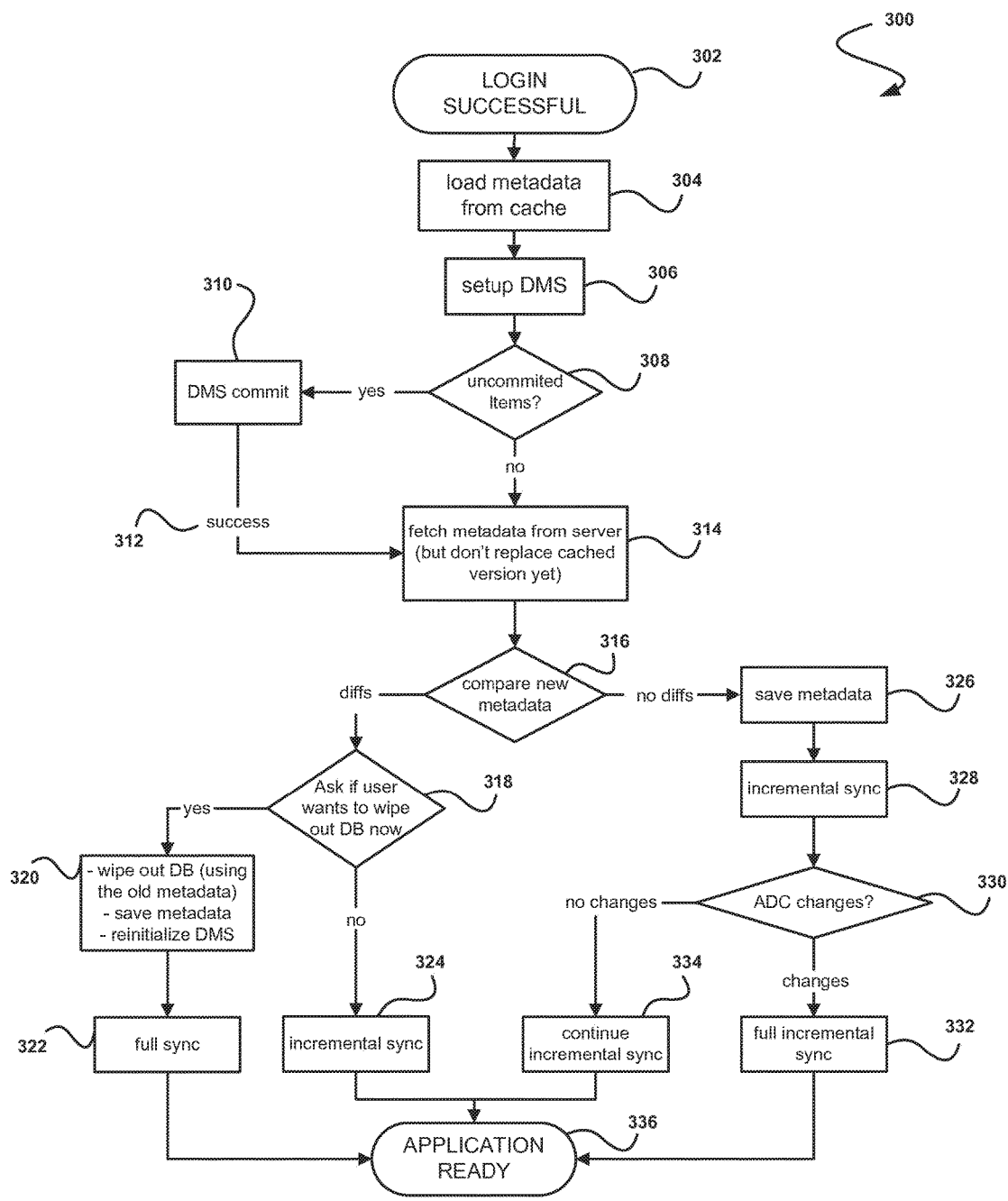
FIG. 3 illustrates a method for performing system synchronization during a subsequent login, in accordance with another embodiment.

FIG. 3 illustrates a method 300 for performing system synchronization during a subsequent login, in accordance with another embodiment. As an option, the method 300 may be carried out in the context of the functionality of FIGS. 1-2. Of course, however, the method 300 may be carried out in any desired environment. The aforementioned definitions may apply during the present description.

As shown in operation 302, it is determined that a subsequent login is successful. In one embodiment, the subsequent login may include any login after an initial login. For example, the subsequent login may occur an hour after an initial login, a day after an initial login, a week after an initial login, etc. Additionally, as shown in operation 304, metadata is loaded locally from a client cache. In one embodiment, the metadata may represent all object types associated with a user of an application on the client.

Further, as shown in operation 306, the DMS is set up at the client. In one embodiment, setting up the DMS at the client may include setting up one or more data structures in the memory of the client that reflect one or more attributes of data stored in the client. In this way, an overview of the data in the client database may be created.

Further still, as shown in decision 308, it is determined whether any uncommitted items exist at the client. In one embodiment, it may be determined whether any modifications have been made to data at the client that have not yet been synchronized with the server. For example, a user may have made changes to the data on the client while the client was not connected to the server. In another example, the user may have made changes to the data on the client and may have not committed those changes, may have made the changes locally, etc.

If it is determined in decision 308 that one or more uncommitted items exist at the client, then in operation 310 such items are committed (e.g., sent, etc.) from the DMS to the server. If it is determined in decision 308 that no uncommitted items exist at the client, or if the committing of such items is confirmed in operation 312, then in operation 314 all metadata associated with the application at the client is fetched from the server to the client. In one embodiment, the metadata may include all object types and field types associated with the application that are currently stored at the server. In this way, a summary of data stored at the server may be retrieved after it is confirmed that all local data has been sent to the server.

Additionally, in decision 316 it is determined whether a difference exists between the metadata fetched from the server and the metadata loaded from the client cache. If in decision 316 it is determined that differences do exist, then in decision 318 it is determined whether a user desires to immediately clear their client database. In one embodiment, immediately clearing the client database (e.g., wiping the database, etc.) may include removing all object types and fields from the database of the client.

If in decision 318 it is determined that the user desires to immediately clear their client database, then in operation 320 the client database is cleared using the metadata stored in the client, the new metadata from the server is saved to the client, and the DMS in reinitialized. In one embodiment, the DMS may be set up at the client using the updated metadata retrieved from the server. Further, as shown in operation 322, a full synchronization is performed. In this way, the latest data on the server may be recreated at the client. In one embodiment, one or more data conflicts may be resolved during the synchronization. See, for example, U.S. patent application Ser. No. 13/116,829, filed May 26, 2011, which is hereby incorporated by reference in its entirety, and which describes exemplary techniques for resolving data conflicts.

Further still, if in decision 318 it is determined that the user does not desire to immediately clear their client database, then in operation 324 an incremental synchronization is performed between the client and the server. In one embodiment, the incremental synchronization may include only sending changes made to data objects and fields described by the metadata loaded from the client cache, and not sending changes or additions to new data objects and fields described by the metadata fetched from the server. In another embodiment, a full synchronization may be performed by the user at a later date. In this way, the user may not be forced to perform a full synchronization at an inconvenient time (e.g., during a trip, during a time of low connectivity, before a meeting, etc.).

Also, if in decision 316 it is determined that no differences exist, then in operation 326 the metadata fetched from the server is saved at the client. In this way, the client may have an updated description of all data associated with the application that is stored at the server. Additionally, as shown in operation 328, an incremental synchronization is performed between the client and server. In one embodiment, the client may request all application data that has changed since the last synchronization between the client and server.

Additionally, in decision 330 it is determined whether any dataset changes have occurred with respect to the user of the application at the client. For example, a new member may have joined a team where the user is a member, and the new member's joining may increase the access of the user to additional objects within the server (e.g., additional account access, etc.). In another example, the user may change districts and may need access to accounts for a new district. In one embodiment, a flag may be created that notes whether dataset changes have occurred or whether new metadata exist at the server.

If it is determined in decision 330 that dataset changes have occurred, then in operation 332 a full incremental synchronization is performed. In one embodiment, all data associated with the application may be requested from the server by the client, and the number of objects that need to be sent may be recalculated, but no changes may be made to the local database at the client.

Further, if it is determined in decision 330 that dataset changes have not occurred, then in operation 334 the incremental synchronization performed in operation 328 is continued. Also, as shown in operation 336, it is determined that the application on the client is ready for use. In this way, operations such as full synchronizations, incremental synchronizations, and client database clearing may be performed dynamically based on the state of the data within the system as well as the status of the user of the application at the client.

Figure 4:
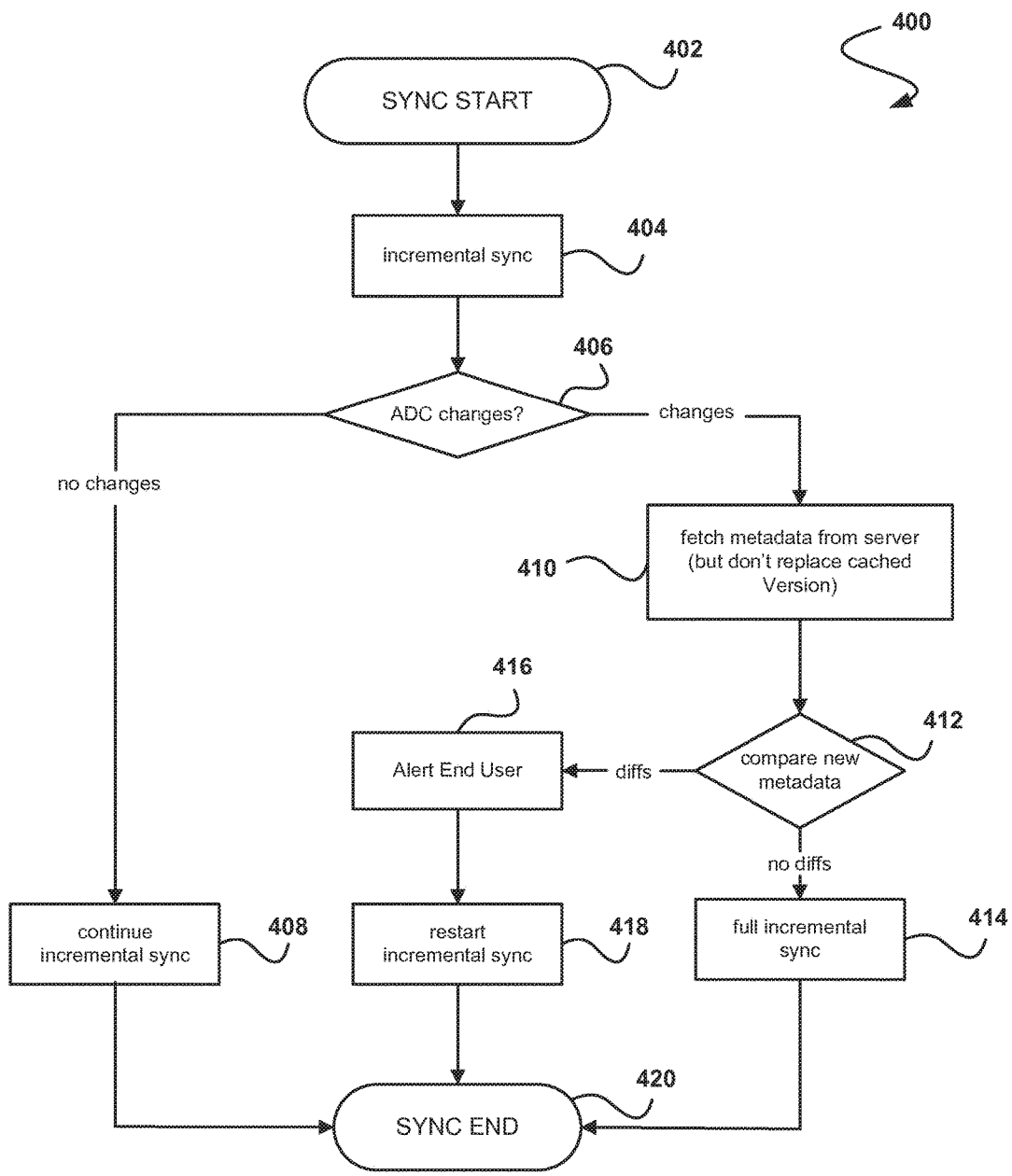
FIG. 4 illustrates a method for performing system synchronization while an application is running, in accordance with another embodiment.

FIG. 4 illustrates a method 400 for performing system synchronization while an application is running, in accordance with another embodiment. As an option, the method 400 may be carried out in the context of the functionality of FIGS. 1-3. Of course, however, the method 400 may be carried out in any desired environment. The aforementioned definitions may apply during the present description.

As shown in operation 402, the synchronization is started between a client and server of a system while an application of the client is running. In one embodiment, a user may have already logged into an application of the client before the synchronization has started. In another embodiment, a previous synchronization may have been performed upon the user successfully logging in to the application of the client.

In yet another embodiment, the synchronization may be started according to a schedule. For example, a synchronization interval may be determined, and the synchronization may start according to that interval.

Additionally, as shown in operation 404, an incremental synchronization is performed. Further, as shown in decision 406, it is determined whether any dataset changes have occurred with respect to the user of the application at the client. If it is determined in decision 406 that dataset changes have not occurred, then in operation 408 the incremental synchronization performed in operation 404 is continued. For example, any objects or fields in the server that have changed since the last synchronization may be updated at the client.

If it is determined in decision 406 that dataset changes have occurred, then in operation 410 metadata is fetched from the server, but such fetched metadata does not replace the metadata stored at the client. Additionally, as shown in decision 412, it is determined whether a difference exists between the metadata fetched from the server and the metadata loaded from the client cache. If in decision 412 it is determined that no differences exist, then in operation 414 a full incremental synchronization is performed.

Further, if in decision 412 it is determined that differences do exist, then in operation 416 the end user is alerted. In one embodiment, a notice (e.g., a pop up window, message, electronic mail message, etc.) may be provided to the user that differences exist between the metadata at the server and client. For example, a pop-up window may be presented to the user that may allow the user to restart the application on the client or ignore the alert and continue using the application. Additionally, as shown in operation 418, the incremental synchronization is restarted.

Further still, as shown in operation 420, the synchronization is completed. In one embodiment, the synchronization may be verified as having successfully completed. In this way, data may be synchronized between the client and server of the system while the application is running on the client in order to ensure that data on the client and server is kept current. Additionally, the system may ensure that data changes are detected and propagated at login and other key events, conflicting data is resolved, and users are informed of relevant events.

System Overview

Figure 5:
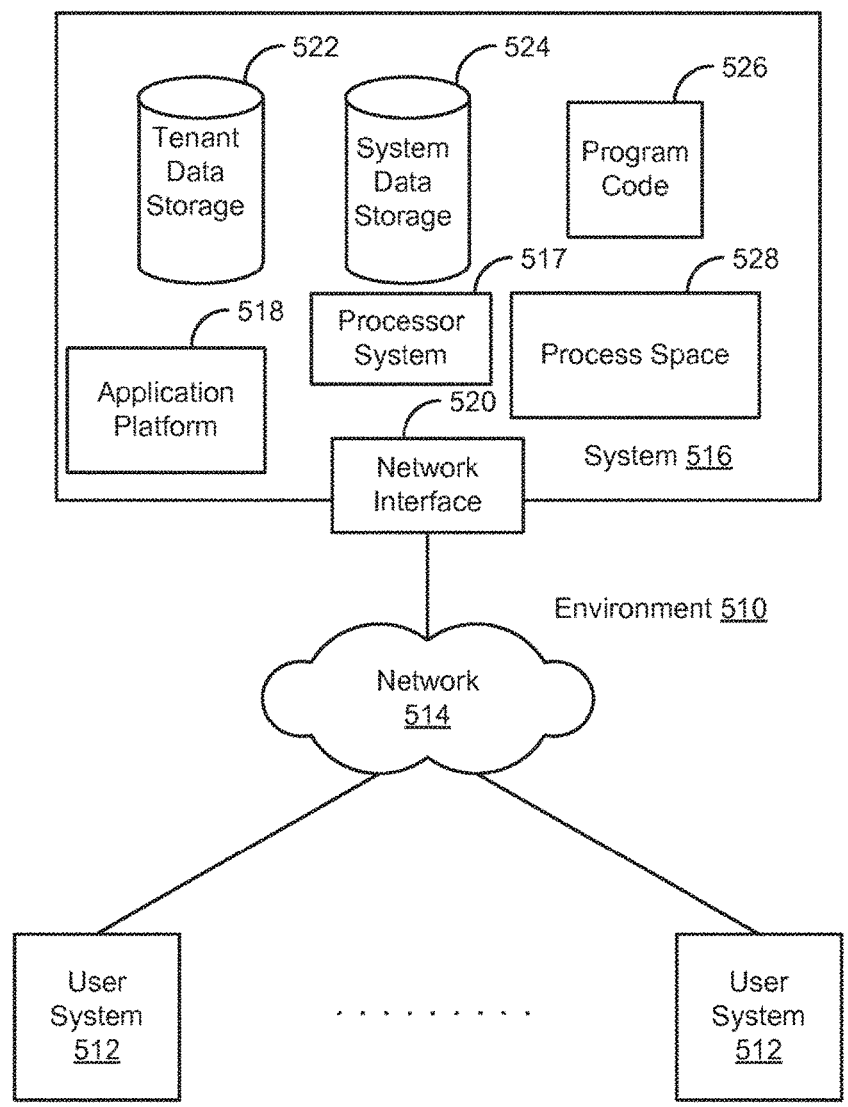
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 6:
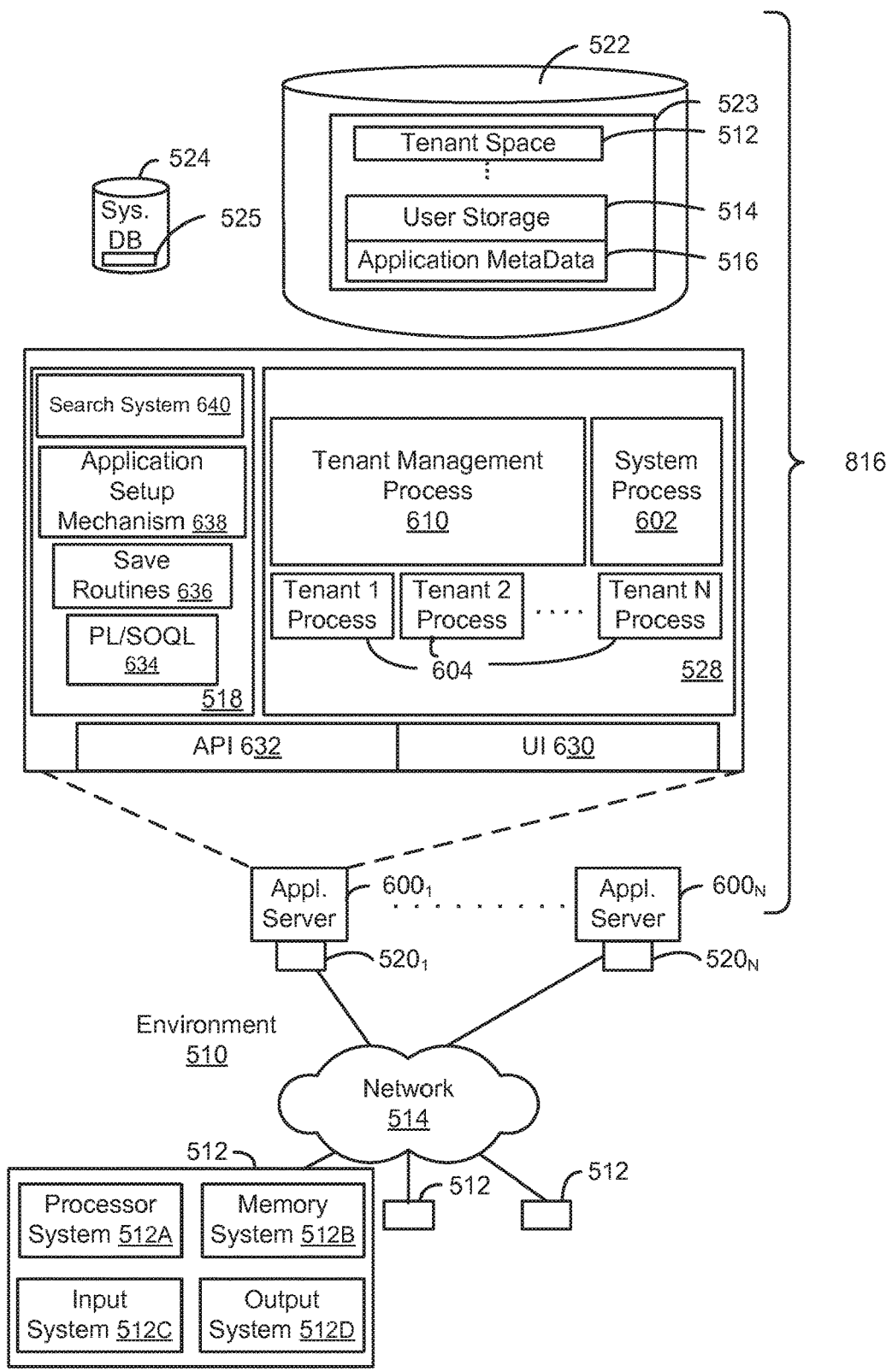
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600₁ might be coupled via the network 514 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable storage medium having computer instructions stored thereon that, when executed by a computer system, cause operations comprising:
   receiving, from an application running on a user device, an application data request;
   subsequent to receiving the application data request, detecting a loss of connection to the user device;
   storing changes to application data corresponding to the user device;
   detecting a connection to the user device; and
   performing a synchronization of data with the application comprising sending the changes to the application data to the user device, wherein the synchronization is performed in response to an event other than a user of the user device logging into the application, and wherein the synchronization is performed while the application is running on the user device.

2. The computer-readable storage medium of claim 1, wherein operations further comprise receiving, prior to receiving the application data request, an indication that the user has successfully logged into the application.

3. The computer-readable storage medium of claim 1, wherein the changes to the application data comprise all application data that has changed since a previous synchronization with the application.

4. The computer-readable storage medium of claim 1, wherein the synchronization comprises sending all application data associated with the user to the user device.

5. The computer-readable storage medium of claim 1, wherein the synchronization comprises sending, to the user device, an indication that changes to the application data exist.

6. The computer-readable storage medium of claim 1, wherein the synchronization is performed in response to an indication that the application is running on the user device.

7. The computer-readable storage medium of claim 1, wherein the synchronization is performed at a predetermined interval.

8. The computer-readable storage medium of claim 1, wherein performing the synchronization comprises determining that the changes to the application data have been made since a previous synchronization with the application.

9. The computer-readable storage medium of claim 1, wherein performing the synchronization comprises receiving, from the application, a request to perform the synchronization.

10. The computer-readable storage medium of claim 1, wherein the application data comprises account information for the user.

11. The computer-readable storage medium of claim 1, wherein the application data comprises object data, detail data, metadata, or any combination thereof.

12. A method, comprising:
    receiving, by a system from an application running on a user device, an application data request;
    detecting, by the system subsequent to receiving the application data request, a loss of connection to the user device;
    storing, by the system, changes to application data corresponding to the user device;
    detecting, by the system, a connection to the user device; and
    performing, by the system, a synchronization of data with the application comprising sending the changes to the application data to the user device, wherein the synchronization is performed in response to an event other than a user of the user device logging into the application, and wherein the synchronization is performed in response to an indication that the application is running on the user device.

13. The method of claim 12, further comprising, in response to receiving the application data request, determining that the application data request corresponds to subscriber of a service provided by the system.

14. The method of claim 12, further comprising receiving, prior to receiving the application data request, an indication that the user has successfully logged into the application.

15. The method of claim 12, wherein the changes to the application data comprise all application data that has changed since a previous synchronization with the application.

16. The method of claim 12, wherein performing the synchronization comprises receiving, from the application, a request to perform the synchronization.

17. A system, comprising:
    a processor; and
    a memory that includes one or more stored sequences of instructions that, when executed by the processor, cause a computer system that includes the processor to carry out operations comprising:
        receiving, from an application running on a user device, an application data request;
        detecting, subsequent to receiving the application data request, a loss of connection to the user device;
        storing changes to application data corresponding to the user device;
        detecting a connection to the user device; and
        performing a synchronization of data with the application comprising sending the changes to the application data to the user device, wherein the synchronization is performed in response to an event other than a user of the user device logging into the application, and wherein the synchronization is performed in response to an indication that the application is running on the user device.

18. The system of claim 17, wherein the operations further comprise receiving, prior to receiving the application data request, an indication that the user has successfully logged into the application.

19. The system of claim 17, wherein the synchronization is performed at a predetermined interval.

20. The system of claim 17, wherein performing the synchronization comprises determining that the changes to the application data have been made since a previous synchronization with the application.

* * * * *